United States Patent [19]

Miller, Jr. et al.

[11] 4,071,705

[45] Jan. 31, 1978

[54] QUANTIZED NON-SYNCHRONOUS CLIPPED SPEECH MULTI-CHANNEL CODED COMMUNICATION SYSTEM

[75] Inventors: Ralph H. Miller, Jr.; William W. Dyer, both of La Mesa; John A. Waterbury, San Diego; Wayland A. Carlson, San Diego; Richard O. Eastman, San Diego, all of Calif.

[73] Assignee: The United States of America as represented by the Secretary of the Navy, Washington, D.C.

[21] Appl. No.: 107,591

[22] Filed: May 3, 1961

[51] Int. Cl.² .............................................. H04J 3/00
[52] U.S. Cl. .................................................. 179/15 BA
[58] Field of Search ............. 179/15 AP, 15.6, 15 BA

[56] References Cited

U.S. PATENT DOCUMENTS

| | | | |
|---|---|---|---|
| 2,902,542 | 9/1959 | Treadwell | 179/15 AP |
| 2,962,553 | 11/1960 | Halina | 179/15.6 |

Primary Examiner—Howard A. Birmiel
Attorney, Agent, or Firm—Richard S. Sciascia; Paul N. Critchlow; Roy Miller

EXEMPLARY CLAIM

1. A quantized nonsynchronous clipped speech multi-channel coded communications network comprising a multiplicity of transmitter terminals and receiver terminals; each of said transmitter terminals comprising a multiplicity of audio processing sections, including input means for coupling a composite waveform thereto, pre-emphasis means for generating crossover points corresponding to amplitude excursions in the input composite waveform, clipper means operatively receiving the output of said pre-emphasis means for infinitely clipping the composite waveform thereby removing the amplitude portion and leaving the frequency information, pulse generating means operatively coupled to the output of said clipper means and receiving the output of said clipper means for generating output pulses corresponding to the zero crossover points in the infinitely clipped waveform; a multiplicity of encoding sections corresponding to the audio processing sections, including gate generator means operatively receiving the output of said pulse generating means for generating gate pulses corresponding to said output pulses; a timing unit including, OR circuit means operatively coupled to said gate generating means and receiving pulses therefrom, sampling means for generating pulses corresponding to a desired sampling rate, coincidence means operatively coupled to the output of said sampling means and said OR circuit means for generating an output pulse when pulses from said OR circuit means and said sampling means coincide therein, channel coding means comprising a delay line operatively receiving output pulses from said coincidence means for generating a start stop and channel pulses corresponding to desired channel codes; second coincidence circuit means in said channel unit operatively coupled to said channel coding means and said gate generating means for generating an output pulse when pulses from said gate generating means and said channel coding means coincide therein; and transmitting means operatively coupled to said channel coder means and said second coincident circuit means for receiving start stop pulses from said channel coding means and output pulses from said second coincidence circuit means corresponding to channel codes and propagating pulse trains therefrom; each of said receiver terminals comprising; receiver means for receiving and detecting trains of pulses; channel decoder means for receiving said detected pulse trains, a multiplicity of channel coincidence means operatively coupled to the output of said channel decoder means for generating an output pulse when start stop and channel pulses are coincident therein; audio restorer means corresponding to said channel coincidence means including, flip-flop means operatively receiving output pulses from said channel coincidence means for generating a substantially square waveform in the output thereof, and integrator means receiving the output of said flip-flop and producing a waveform therefrom approximating said original composite waveform.

12 Claims, 8 Drawing Figures

QUANTIZED NON-SYNCHRONOUS CLIPPED SPEECH MULTI-CHANNEL CODED COMMUNICATION SYSTEM

The invention described herein may be manufactured and used by or for the Government of the United States of America for governmental purposes without the payment of any royalties thereon or therefor.

The present invention relates to a communications system and more particularly to a quantized nonsynchronous clipped speech multi-channel coded communications system.

The present system is proposed to provide satisfactory communications through heavy interference and jamming. In approaching the problem of providing satisfactory communications with the above conditions prevailing, various pulse-modulated multiplex systems were investigated and discarded. The prior systems presented a serious problem because of the use of synchronization signals between the unit stations. Since, if the synchronization signal were jammed or blocked the system became useless. Although high power rf links partly overcome this shortcoming the requirement of high power introduces other limitations and does not totally negate the blocking or jamming of the synchronization signal with the resulting failure of the link communication.

Therefore, a system was proposed and disclosed in copending Patent Application entitled Random Transmission Clipped Speech Coded Communications System, Ser. No. 106,413, filing date Apr. 27, 1961, hereinafter referred to as Clipco One. Clipco One was not designed for secure communications, but to operate through heavy jamming an interference and the principles upon which it depends and its mode of operation are briefly as follows.

It is known that removal of the amplitude component of speech and utilization of only the frequency component degrades intelligibility by only a negligible amount. The process of separating speech into its two components, retaining frequency and eliminating amplitude, is referred to as "infinite clipping" because of the major technique involved. More specifically, speech is passed through a high-pass filter or pre-emphasis network, then heavily peak-clipped, which destroys the amplitude component, amplified, and the resulting "rectangular" wave differentiated and rectified. This technique produces a spike at the beginning and end of each frequency period which may be transmitted as a high-power short-duration pulse of energy. At the receiver terminal the pulses may be used to turn on and off a flip-flop multivibrator whose output may then be integrated to form a reasonable facsimile of the original speech frequency.

Multiplexing is added to this type of pulse communication by the use of channeling codes. For example, instead of transmitting a single pulse on the upward swing of the rectangular intelligence wave for the control of the flip-flop circuit, the pulse is inserted at its assigned time-position between two fixed framing or start-stop pulses and the resulting three-pulse train transmitted. The receiver recognizes the time-position as being assigned to a specific channel and decodes the train to a single pulse which actuates the flip-flop of that channel.

In Clipco One, the different channel codes are transmitted randomly, one for each speech crossover in each channel. The present invention, referred to as Clipco Two, differs over Clipco One in that all channels may be transmitted simultaneously with common framing pulses, rather than at random time intervals. Through the use of a common framing pulses and the transmission of the channel codes simultaneously with the common framing pulses rather than a random time interval transmission as in Clipco One, lower average power is required and, in addition, the inter-channel interference encountered in Clipco One is eliminated.

Therefore, an object of the present invention is to provide a communications system which will give satisfactory operation through heavy interference and jamming.

A further object of the present invention is to provide a quantized nonsynchronous clipped speech communication system which will give satisfactory communications through heavy interference and jamming.

A further object of the invention is to provide a nonsynchronous multiplexed communications system.

Another object of the present invention is to provide a system wherein a multiplicity of channels may be time multiplexed without the use of synchronizing signals between unit stations.

A further object of the present invention is to provide a multiplexed system utilizing common start and stop framing pulses to obviate synchronization between unit stations.

Another object of the present invention is to provide a nonsynchronous time multiplexed communications system which has low average power output.

Another object of the present invention is to provide a nonsynchronous multiplexed communications system wherein transmitted power is dependent upon the presence of information in the system.

A further object of the invention is to provide a nonsynchronous multiplexed transmitter terminal.

A further object of the present invention is to provide multiplexed communications system having minimum interchannel interference.

A further object of the present invention is to provide a novel transmitter multiplexing system.

A further object of the present invention is to provide a multiplexing unit wherein synchronization signals are dependent upon the presence of information in a channel.

A further object of the invention is to provide a quantized nonsynchronous clipped speech channel coded communications system wherein a communication may be addressed to a particular receiving station.

Various other objects and advantages will appear from the following description of the invention, and the novel features will be particularly pointed out hereinafter in connection with the appended claims.

The objects and advantages of the present invention are obtained through the use of a communications system utilizing a pulse technique wherein pulses are generated at the crossover points of the frequency component of the composite waveform containing intelligence therein. When generating the pulses corresponding to the crossover points, the composite waveform is separated into two components, one consisting of amplitude information and the other, frequency information. Frequency information is retained and amplitude information is eliminated through a technique referred to as "infinite clipping".

The system is designed to handle a multitude of channels and requires multiplexing, therefore, requires the use of a multiplexing technique. The multiplexing technique utilized consists of generating common start and stop pulses, referred to as framing pulses, simultaneously transmitting therewith all channels having information therein along with the common framing pulses. However, no synchronization signal is used as such therefore, the transmitter is in operation only when there is intelligence present on one of the channels, thereby keeping average power output requirements at a minimum.

The receiver portion of the system is designed to accept the pulses representing frequency information of th original composite wave. The receiver portion reshapes the incoming pulses, separates the sequential train input to the appropriate output channels, converts the pulses to a substantially square wave through the utilization of a flip-flop and through the use of an integrator produces an output waveform which substantially approximates the original composite waveform coupled to the input of a transmitter unit.

Reference is now made to the following description taken in conjunction with the accompanying drawings in which.

The system will be described in conjunction with the accompanying drawings wherein like numerals indicate like parts.

For the purposes of illustrating the present invention, the description which follows is directed to a twenty channel system, however, this is by no means a limiting factor in that the number of channels may be varied as desired.

The system will also be discussed using speech as the signal being acted upon however, it is to be understood that various types of inputs may be used such as facsimile or teletype. However, since speech is the most difficult to implement, it has been used as the basis for the following analysis.

Speech sounds are formed by the acoustic excitation of the vocal tract. This excitation may consist of a periodic pressure wave generated at the larynx or may consist of turbulence generated at some point of constriction along the vocal tract. The frequency of larynx vibration establishes the pitch frequency which may lie anywhere between 100 and 400 cycles per second, depending on the physical characteristics of the speaker. The vocal cavity transmission characteristic acting on the larynx signal causes certain harmonics of the pitched frequency to pass with less attenuation than others. This may be shown by the spectral energy distribution of voice sounds, shown in FIG. 3. The pitch frequency and its harmonics are shown in dotted lines, while the broader peaks of energy, called formants, result from the influence of the transmission characteristics of the vocal cavity. Most of the significant information content of speech is contained in the frequency regions covered by the first three formants and which have a dynamic amplitude range from +12 to −28 db around an average level which is primarily determined by the speakers natural characteristics and his surroundings. The speakers animation and recognition, or voice quality, is due mainly to the voiced character and inflection in the speech spectrum and these combine to cover a range which goes considerably beyond the first three frequency formants and an amplitude range to 60 db.

Figure 1:
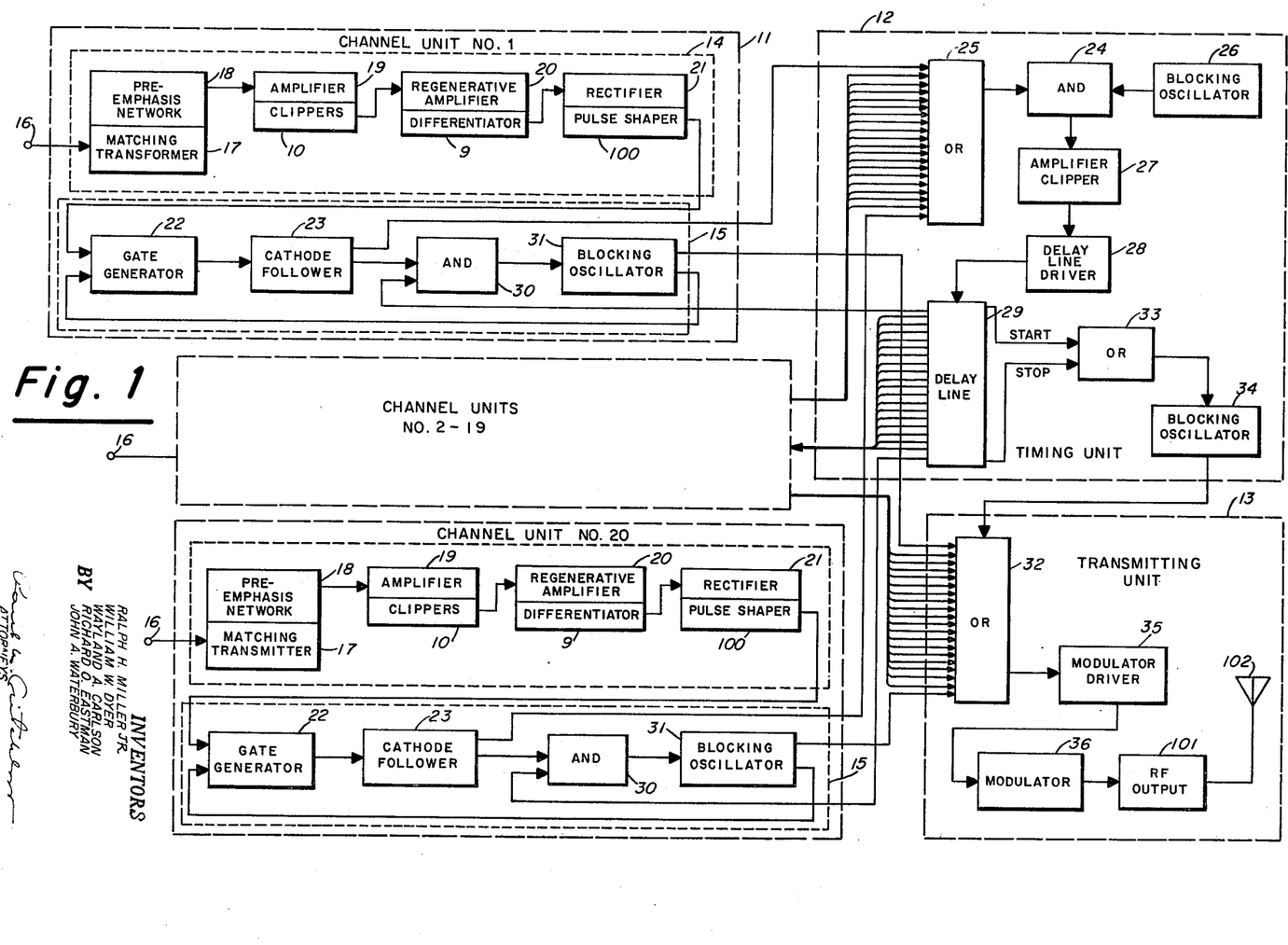
FIG. 1 is a simplified block diagram of the transmitter terminal.

For purposes of illustration, one channel of the system will be treated, however, it is to be understood that the remaining 19 channels function the same as the one channel discussed. With reference to FIG. 1, there is shown a channel unit 11 corresponding to channel 1, a timing unit 12 which enables the multiplexing of the individual channel inputs, and a transmitting unit 13 which propagates the pulse trains. Contained within channel unit 11 is a speech processing section 14 and an encoding section 15.

Figure 3:
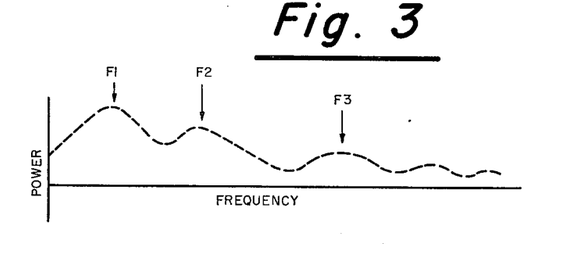
FIG. 3 is a simplified diagram showing the spectral distribution of voice and speech signal energy.
Figure 4:
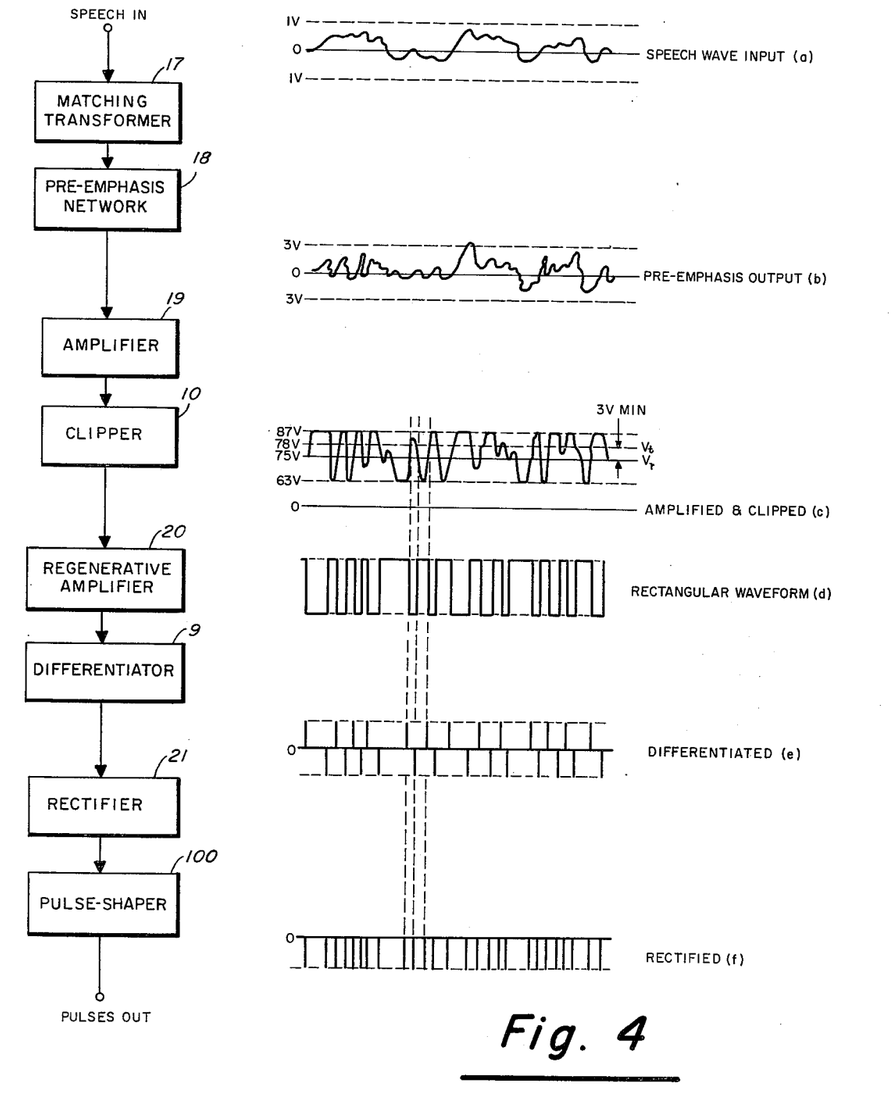
FIG. 4 is a diagram of section waveforms at various points in the audio processing unit.

In the operation of the system, a composite waveform such as that in FIG. 4(a) is coupled to the audio processing section at point 16 and thence to a matching transformer 17 and pre-emphasis network 18. When two or more frequency signals are present in a composite waveform, the weaker signals are suppressed if the signal under goes extreme clipping. Since, as shown in FIG. 3, the power or amplitude or either formant 2 or 3 is less than that of formant 1, severe clipping may result in the loss of considerable intelligence contained in these two, as well as higher, formants unless amplitude compensation for these formants is incorporated. In that the average speech power spectrum has a falling characteristic of approximately 9 db per octave from 500 cycle to 4 kc, the pre-emphasis network is designed to have a rising frequency characteristic of approximately 9 db per octave through the same frequency range which will provide the necessary ampltitude compensation. The output waveform from the pre-emphasis network is shown in FIG. 4(b).

The output waveform from the pre-emphasis network is then coupled to an amplifier 19 for the infinite clipping which removes the amplitude information in the waveform. When clipping a waveform of varying amplitude, the smallest signal to be clipped determines the clipping level. if the clipping level is fixed, then the smallest signal determines the amount of amplification necessary prior to clipping. Since the major information content of speech signal is contained in a dynamic range of 40 db, as previously stated, the minimum amplification required is 40 db. In that the average speech level also varies, another 20 db of gain is added for compensation, giving a total gain of 60 db prior to infinite clipping. This amplification is obtained through the use of the single resistance-coupled amplifier 19 and two cathode-coupled symmetrical clipper amplifiers contained within a clipper 10. The output waveform from the clipper 10 is shown in FIG. 4(c).

As stated previously, the composite waveform may experience extreme clipping following pre-emphasis whle loosing only a small percentage of the intelligence contained therein. However, in order to achieve this clipping, a large degree of amplification is necessary. It is apparent that this amplification is applied not only to speech, but also inevitably to hum and noise that occur between words. Therefore, if a pulse were generated for every amplitude transition, whether it be speech or noise, a very noisy, inefficient, and high-duty-cycle system would result. Consequently, circuit-generated noise is reduced as much as practicable.

Thus, it can be seen that some form of noise suppression is necessary since it is desired only to generate pulses corresponding to the frequency components of the input waveform. A regenerative amplifier 20 fulfills this function by acting as a base clipper to suppress more noise than signal. Base clipping can best be understood by referring to FIG. 4(c) which also shows the results of the peak clipping in the previous amplifiers. The trip level, $v_t$, of the regenerative amplifier 20 is a fixed potential. The reference or quiescent level, $v_r$, is an adjustable potential which is set so that the majority of the system noise peaks will not exceed $v_r$.

The regenerative amplifier 20 is essentially a bistable device. The audio signals vary about $v_r$, and when they reach $v_t$ they trigger the regenerative amplifier to the "on" state and when they return to $v_r$, they trigger it to the "off" state. As a result, a series of rectangular waveforms are generated at the regenerative amplifier the width of which are determined by the frequency of audio transitions about $v_t$. Hence, the output waveforms of FIG. 4(d) contain primarily the frequency information of the originating audio signals or composite waveform. The output signals also contain some amplitude information, in the form of a frequency shift, due to the finite rise and fall time of the audio wave and the difference between $v_t$ and $v_r$. However, for all practical purposes the audio signal has been infinitely clipped, i.e., amplitude variations have been removed. The rectangular waveforms from the regenerative amplifier portion of 20 are then differentiated in a differentiator 9. By this means the speech transitions are converted into a series of pulses as shown in FIG. 4(e).

When the rectangular waveform is differentiated, a positive and a negative pulse are generated. To utilize these pulses in a subsequent system, however, they must be unidirectional; therefore, the differentiated output is rectified, in a rectifying circuit 21. The output of 21 is then fed to a pulse shaping circuit 100 consisting of a pulse amplifier, blocking oscillator driver, and blocking oscillator. The pulse amplifier is incorporated to compensate for variations in the differentiated pulse amplitudes and to assure a sufficient trigger pulse to the driver. The blocking oscillator driver performs the primary function of a buffer amplifier while at the same time triggering the blocking oscillator. The blocking oscillator insures that the output pulses from the pulse shaping circuitry have constant pulse width and amplitude. The output pulse from the pulse shaping circuitry 100 is a negative pulse, 0.5 microseconds wide and having a peak amplitude of 70 volts.

In systems using time-division multiplexing, many channels are propagated over a common medium by allocating different time intervals for the transmission of each channel. The encoding section 15 and timing unit 12 combine to perform the functions of generation and allocation of the timing information. The timing unit generates clock or synchronizing pulses at appropriate time intervals and the encoding sections then select the appropriate synchronizing pulse corresponding to the channel required. A typical sequence of events for three audio processors and their encoder sections and the timing unit are shown in FIG. 5, which are explained subsequently.

The negative pulses from the audio processing section trigger a gate generator 22 in an encoding section 15. The gate generator is a flip-flop having a preferred state which provides a positive output gate pulse when triggered. The termination of the gate will be explained subsequently in the discussion of the timing unit 12. The gate generator 22 is isolated by a cathode follower 23 which activates the timing unit and And gate 30.

Figure 5:
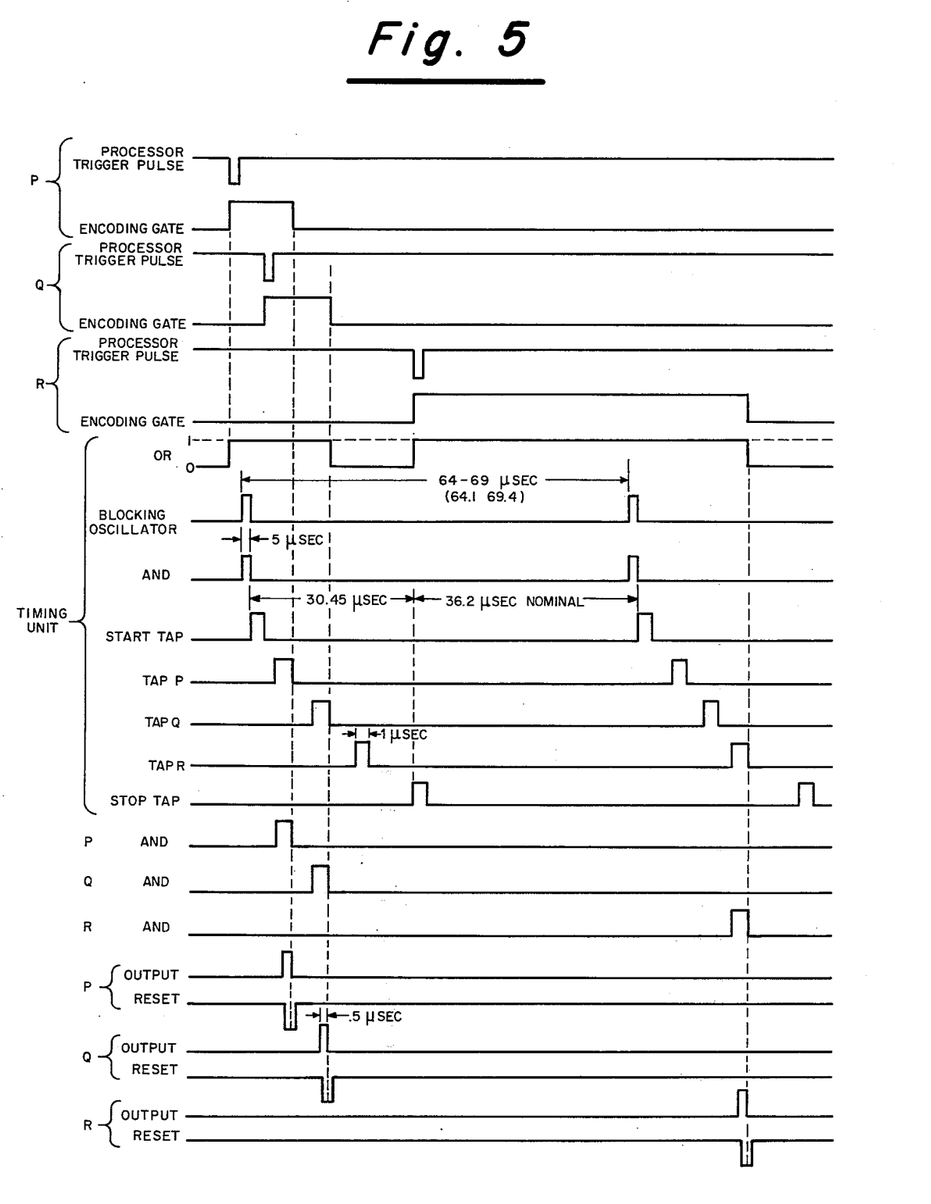
FIG. 5 is a generalized timing diagram for three encoder sections in one timing unit.

The gate pulses generated by each of the gate generators of the individual channel units are then buffered through OR gate 25 as shown in FIG. 5. The output of the buffer circuit has two fixed levels representing either a 0 or a 1. The 0 level represents the case of no information on any of the channel inputs, whereas the 1 level signifies that at least one channel has generated a gate pulse. The output of the summing circuit 25 is one input to a two point coincidence circuit 24. The other input to the coincidence circuit or And gate is the output of a variable blocking oscillator 26 which randomly samples the state of the OR circuit output. If the output is in state 1, then a single pulse is coupled to a clipper amplifier 27. If the output is a zero then there is no pulse coupled to the clipper amplifier.

At this point reference is made to the input-output characteristics of the audio processing section. If all of the frequency components of speech were converted to pulse, a system with a high duty cycle would be required. In converting audio signals to pulses, a compromise must be maintained between the reconstructed intelligence and the pulse repetition rate. By using appropriate testing techniques a compromise was established which minimizes the pulse repetition rate while still maintaining intelligibility. A minimum pulse rate is obtained for maximum intelligence through the adjustment of a bias control, not shown, on the regenerative amplifier 20. Using rapid conventional speech as an input signal at an ambient signal-to-noise ratio of 28 db, an average output pulse rate of 2050 pulses per second was measured. This figure of 2050 pulses per second is considered typical for the audio processing section described.

Now referring back to blocking oscillator 26, the output of the oscillator is 0.5 microsecond pulses at a rate of 15 ± 0.6 kilocycles per second, the frequency being determined by the grid circuit RC time constant of the oscillator. In arriving at the average 15 kc sampling rate and its variations the following factors were considered.

In order for band limited speech to contain an optimum amount of information, it is necessary for the bandwidth to contain the first three formants, as shown in FIG. 3, which have an upper frequency limit of 3500 cycles per second. Using the figure of 3500 cycles per second (as the upper limit) results in a maximum pulse rate of 7 kc per second, i.e., 2 pulses for each period, which must be converged by the system. To assure that this maximum information rate is transferred, it must be sampled at a rate that is greater than twice 7 kc per second. Hence, the minimum rate of the blocking oscillator 26 is 14 kc per second.

The maximum sampling rate is limited by the length of delay line of the receiver, in that two separate transmitter pulse trains cannot be in the delay line, 30.1 microseconds, at the same time. Hence, the minimum period must be 60.2 microseconds thereby fixing a maximum sampling rate of 16.6 kilocycles per second.

With the maximum and minimum rates in mind a compromise between the two rates was chosen at 15 kilocycles per second. In addition, in order to minimize the effects of some types of jamming it is desirable that the sampling rate vary somewhat around the nominal value of 15 kc. Therefore, the blocking oscillator circuit configuration used in the present invention provides a frequency of 15 kc plus or minus 4 percent. This variation is well within the limits previously discussed and allows adequate guard bands at either end and results in a samplying rate varying between 14.4 and 15.6 kilocycles per second.

The amplifier clipper 27 is a base clipper and regenerative amplifier. Since there are some base line variations in the output of And circuit 24, the output signal from the And circuit is base clipped to remove the possibility of false triggering of a subsequent delay line driver stage 28. The regenerative amplifier portion provides uniform trigger pulses to the delay line driver from a low impedance cathode follower incorporated therein.

The delay line driver 28 supplies a low-impedance, high-voltage, one-microsecond pulse to a delay line 29. By matching the output impedance of the driver 28 to the characteristic impedance of the delay line 29, multiple reflections in the delay line are minimized. The driver 28 is used in that a large amplitude pulse is required to drive the delay line to compensate for attenuation and still provide a usable signal at the furthest end of the line.

The delay line 29 is a lumped parameter line and generates sequential pulses corresponding to individual channels, all in accurate time-relation to each other and to the trigger or synchronizing pulse. Upon receiving the trigger pulse from the delay line driver 28, two framing pulses, i.e., a start and stop pulse, and 20 channel pulses are generated by the delay line. The first tap on the delay line is at 0.5 microseconds which corresponds to the start pulse of FIG. 6. The second tap is at 1.45 microseconds and corresponds to channel 1. The remaining taps are spaced at intervals of 1.45 microseconds except for the last tap corresponding to the stop tap. The last tap is spaced 1.95 microseconds from channel 20 therefore, the total length of the delay line is 30.45 microseconds. The reason for the odd spacings on the start and stop taps is to compensate for the delay encountered by the channel pulses. The resulting pulse train from the delay line 29 consists of a start and stop pulse 30.45 microseconds apart, enclosing 20 channel pulses 1.45 microseconds apart. At the 15 kilocycle rate of the blocking oscillator 26 there will be a space 36.2 microseconds between the stop pulse of one train and a start pulse of a succeeding train as shown in FIG. 5.

The 20 channel pulses generated in the delay line are coupled to 20 individual encoding sections similar to encoding section 15. An And gate 30 in each encoding section accepts the appropriate channel pulse if the corresponding gate pulse from gate generator 22 is also present. The gate pulse is coupled through cathode follower 23 as shown in FIG. 1 to the input to the And circuit 30. If the gate pulse is present as well as the appropriate channel pulse from the delay line 29 an output pulse is generated which is coupled to blocking oscillator 31. If there is no information on the channel, no gate will be generated; hence, even though a channel pulse is present, there will be no output from And circuit 30. This is illustrated in the case of channel ($r$) in FIG. 5.

When blocking oscillator 31 is triggered there are generated two 0.5 microsecond output pulses one of which is coupled to the encoding gate generator 22 and the other to a buffer circuit or OR circuit 32 in the transmitting unit 13. The latter input to the OR circuit 32 is a positive pulse, while the pulse coupled to gate generator 22 is a negative pulse generated by the recovery of the blocking oscillator 31 and is used to terminate the gate previously started in gate generator 22. By this means the gate is reset, i.e., turned off, enabling it to be started by further pulses from the audio processor. Subsequent channel pulses from the timing unit will not be forwarded to the OR circuit 32 unless a gate has been started by an information pulse from the audio processor section. The output and reset pulses for properly gated channels are shown in FIG. 5 in the lower portion of the figure.

The start and stop pulses which are used for framing are coupled from delay line 29 through an OR circuit 33 which provides isolation between taps. The output of OR circuit 33 is used to drive blocking oscillator 34 whose output is two 0.5 microsecond pulses corresponding to the framing pulses. The framing pulses and the channel pulses from blocking oscillators 34 and 31, respectively, are from identically designed oscillators; hence, insure uniform triggering of the transmitter unit 13.

The output pulses from the audio processing section are randomly distributed in time with respect to the output of blocking oscillator 26. Since the occurrence of sampling pulses from blocking oscillator 26 are not related to the buffer circuit 25, a delay can be experienced between the input to the timing unit 12 and the corresponding output of the timing unit. Consequently, a form of distortion is introduced in which various portions of the speech will be subjected to different times of delay not present in the original speech. The maximum delay is determined by the minimum sampling rate of the blocking oscillator 26, i.e., 14.4 kilocycles per second, or 69.4 microseconds. The minimum delay is approximately 0.2 microseconds when one channel gates the timing unit for another channel. This is shown in FIG. 5 where processor (P) makes a channel pulse available for encoder section (Q). To both of the above maximum and minimum delays must be added the individual inherent delay in the channel coding, the largest of which is 29.5 microseconds for channel 20, i.e., the delay arising from the use of delay line 29. The total delay can be appreciable compared to the period of the highest frequencies of the speech waves, especially the 98.9 microseconds for channel 20, but is negligible for the lower frequencies. These delays reduce intelligibility in the clipped speech about 3 percent below what would be obtained without the delays. It is apparent that this figure or reduction of intelligibility would increase sharply as the sampling rate of blocking oscillator 26 is reduced.

The 0.5 microsecond output pulses from the 20 channel units and the single timing unit comprise the input to the transmitter unit 13. The buffer circuit or OR circuit 32, provides isolation between the individual inputs from the 20 channel units. The output from the summing circuit 32 is used to drive modulator driver 35. Slight fluctuations in the base line generated by the OR circuit 32 are base clipped at the input to the modulator driver as controlled by drive adjust potentiometer, not shown. The modulator driver 35 generates a positive 175 volt low impedance pulse which is adequate for driving a modified AN/APX-6 and presumably many other modulator units.

The AN/APX-6 transponder consists of essentially the following units; a dual tetrode parallel-connected modulator 36 the output of which is stepped up by a modulation transformer, not shown, and delivered to a RF output unit 101. Incorporated in the unit 101 is a transmitter oscillator using a pulse grounded-grid circuit and coaxial double re-entrant line. The frequency used was 1110 megacycle per second during the operations that were conducted with the equipment. Peak radiated power from an antenna 102 is 175 watts of 0.5 microsecond pulses.

For each start-stop pulse coupled to the timing unit 12 there is at least one channel output and, at most, 20 channel outputs. Since the channel outputs are determined by the respective speech inputs, which are completely random in nature, it is difficult to specify the number of channel pulses per framing group, however, by using the average rate of 2050 pulses per second per channel, referred to previously, in the binomial distribution formula, it was determined and confirmed by repeated tests that the most probable occurrence of channel pulses per framing group is from 2 to 4. In order to determine the average duty cycle for full-20 channel operation, the average figure of 3 channel pulses per framing group and the nominal blocking oscillator rate of 1500 samples per second was used. Since the three channel pulses are always accompanied by two framing pulses and all five pulses are 0.5 microseconds in width, the average duty cycle is 3.75 percent. Note that there has been no mention as to which channels are present but only that on the average there are three channels per framing group. This point has particular significance with regard to jamming.

Figure 6:
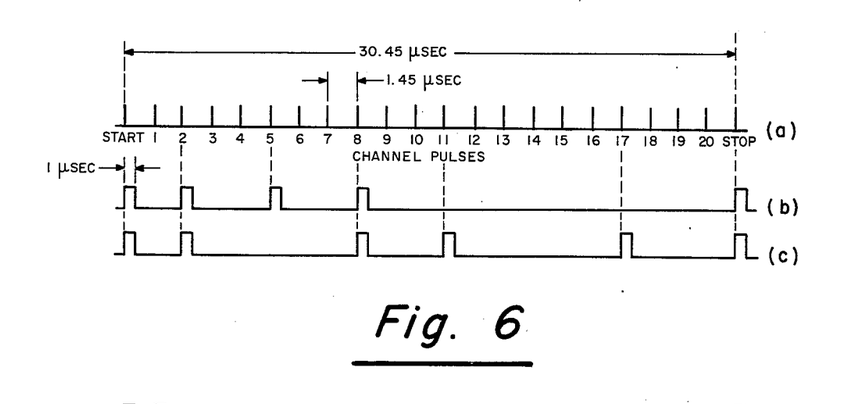
FIG. 6 is the coded pulse train utilized in the invention showing start pulses, stop pulses and some of the various channel codes.

Typical transmitted train configurations are shown in FIG. 6 wherein FIG. 6(a) corresponds to the channel slots as would be represented at the input to OR circuit 32 and FIGS. 6(b) and 6(c) represent pulse train configurations which might be propagated. The first pulse transmitted corresponds to the start pulse followed by equal intervals of 1.45 microseconds which represent the channel slots. The last pulse in the train configuration represent the stop pulse.

Figure 7:
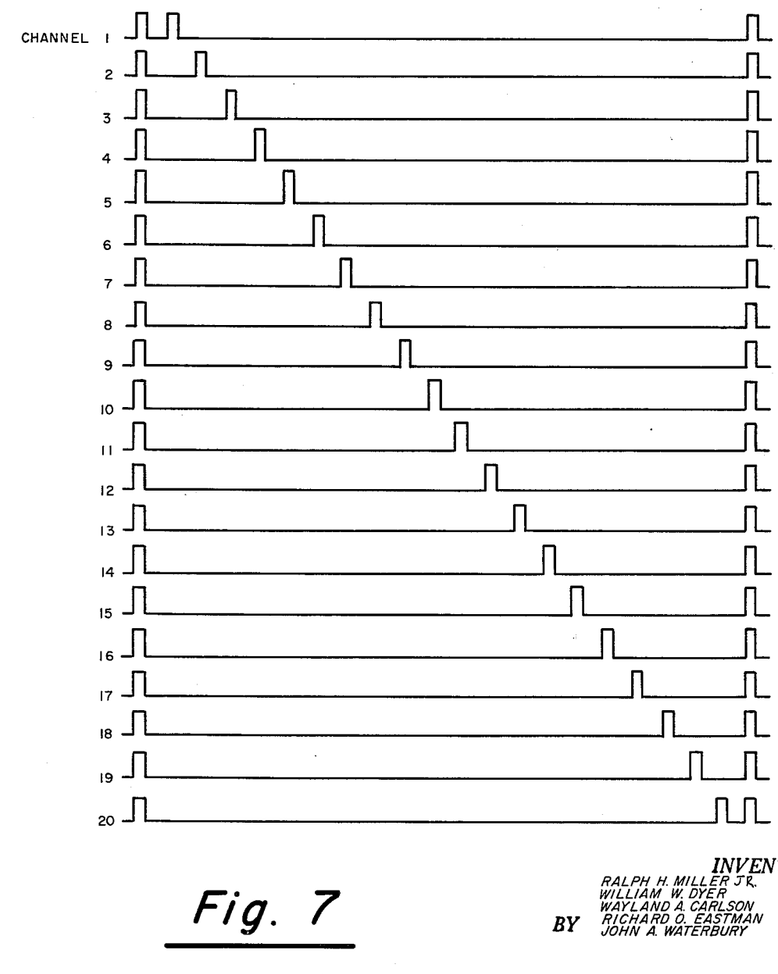
FIG. 7 illustrates the various channel codes.

FIG. 7 merely illustrates the twenty channel codes.

Figure 2:
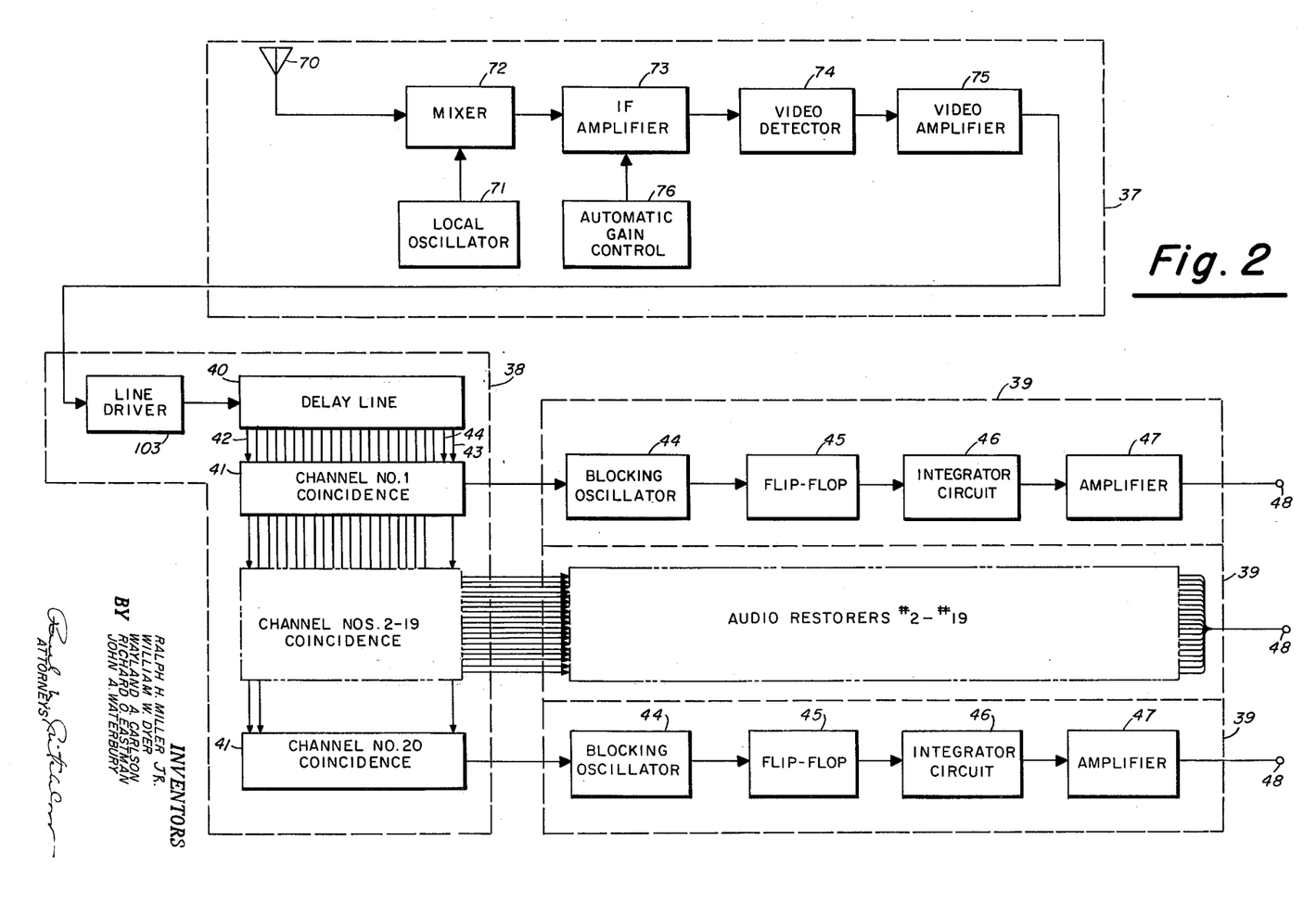
FIG. 2 is a simplified block diagram of the receiver terminal.

The receiver terminal, set forth in FIG. 2 comprises a receiver unit 37, channel decoder 38 and audio restores 39 similar to that shown and described in connection with Clipco One set forth in copending application. The receiver unit is a modified AN/APX-6 receiver of the superheterodyned type operating in the L-band of frequencies. It has a sensitivity of 70 dbm and a bandwidth of 10 megacycles per second at 6 db down from maximum, it functions in the receiver assembly as follows.

Received signals from antenna 70 are coupled to a mixer 72 and mixed with the output of local oscillator 71 resulting in an intermediate frequency signal of 59.5 megacycles per second. This signal is then amplified in IF strip 73 and detected in a video detector 74, producing the original transmitted pulse train configurations. These pulses are then amplified by five video amplifiers incorporated in block 75 which generate a 4 volt peak signal which is coupled to a line driver 103 in the channel decoder unit 38. Automatic gain control is supplied from automatic gain circuits 76 to the IF strip 73. A single receiver and channel decoder unit feed multiple channel units according to the number of channels required.

The purpose of the channel decoder 38 is to separate incoming signals into channels, each channel signal then to be further processed in an individual audio restorer 39. The output pulse train configurations from the receiver unit 37 are coupled into the channel decoder 38 comprising the line driver 103, a delay line 40 and a number of channel coincidence circuits 41 corresponding to the number of channels. The present invention contemplates 20 channels, therefore, 20 channel coincidence circuits are provided, however, as stated previously the description is only with reference to one channel, therefore, the remaining 19 channels are not described.

The output pulses from the video amplifier 75 are coupled to the line driver 103 wherein they are amplified and matched to the input of the delay line 40. Delay line 40 is tapped in accordance with the codes as shown in FIG. 6, therefore, as the three pulse codes pass through the delay line and coincide in the appropriate channel coincidence circuit for the matching channel a positive output pulse is generated in the output of the appropriate coincidence circuit. It must be remembered that simultaneously, codes from twenty channels are fed into the delay line and are made coincident therein by channel taps on the delay line. Looking at the coincidence circuit corresponding to channel one, the delay line is constructed so that line 42 corresponds to a stop pulse in the original transmitted configuration, line 43 corresponds to a start pulse in the original code, and line 44 corresponds to the intelligence pulse in the original code. Due to the design of the delay line, the three pulses corresponding to the start, stop and intelligence pulses will all be present at the appropriate coincidence circuit simultaneously. Due to the coincidence circuit 41 functioning as an And gate, there will be an output pulse generated. The same is true for channels 2 through 20. Channels 2 and 20 are also shown in FIG. 2 wherein arrows have been placed on lines corresponding to the stop, start and intelligence pulses for the particular channel code.

The output of the coincidence circuit is then coupled to an audio restorer circuit 39 consisting of a blocking oscillator 44 for amplifying the pulses and also providing isolation between the audio restorer and coincidence circuit. The output of the blocking oscillator is then coupled to a flip-flop circuit 45 wherein the flip-flop fires positive on one pulse and negative on the next, thus restoring the original differentiated clipped intelligence signal. The restored rectangular intelligence signal is then coupled to an integrator circuit 46 which reduces the harshness and improves the quality of the output signal, especially when voice is being transmitted. From the integrator the signal is then coupled to an output amplifier 47 and from there to output terminals 48 and finally distributed to the appropriate terminal equipment.

Figure 8:
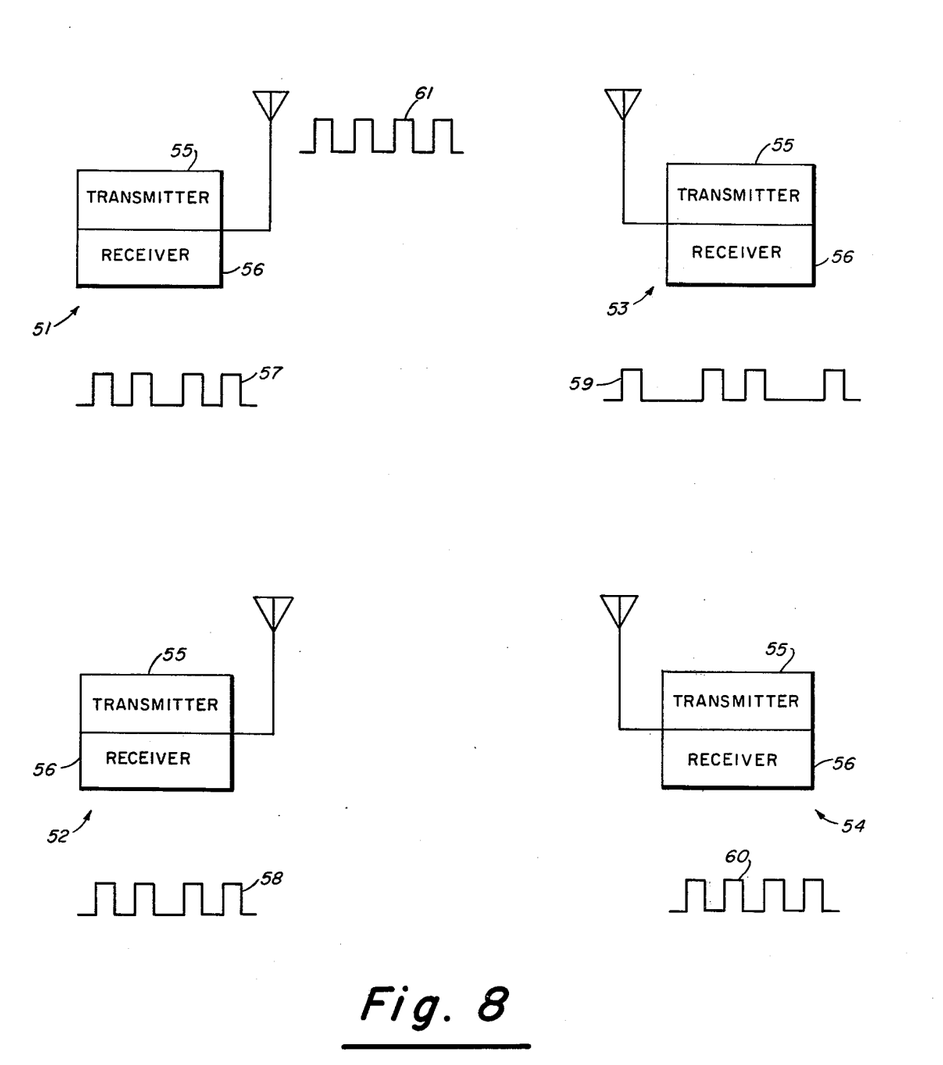
FIG. 8 is a block diagram of a communications net.

FIG. 8 is a simplified block diagram of the proposed system whereby a communication is addressed to a particular receiver system. Individual communications units are indicated at 51, 52, 53 and 54, each unit consisting of a transmitter 55 and receiver 56. The transmitters are of the type disclosed in FIG. 1 of the present invention. However, receivers 55 of communications units 51, 52, 53 and 54, respectively, will consist of only one channel of the receiver system as set forth in FIG. 2. This would include unit 37, units 103 and 40, one channel unit 41, and one audio restorer circuit 39. Each of the receivers has a particular train or group of pulses which it may receive as shown at 57, 58, 59 and 60.

In the operation of the complete net, any one of the units 51, 52, 53 and 54 may communicate with any other of the units. For example, if unit 51 desires to communicate with unit 54, a particular code is transmitted by transmitter 55 of unit 51, corresponding to 61 which is the address of unit 54 and will be received and converted into audio, in the present example, in receiver 56 of unit 54 as shown.

The same would hold for any other of the units, i.e., unit 53 could communicate with unit 52 by transmitting the group of pulses corresponding to the address of the receiver 56 of unit 52 and vice versa.

In the present example, by using a transmitter capable of multiplexing twenty channels, 21 different units such as 51, 52, 53 and 54 may be provided.

Thus, through the use of the present invention interchannel garble is reduced to a minimum. In addition, due to the use of common start and stop pulses with the twenty channels multiplexed therebetween, average power output is reduced to a minimum as compared to a method of random transmission of signals at the transmitter as received and in copending application No. 106,413, filed Apr. 27, 1961. However, most importantly, the system provides twenty channels of quantized, pulse, multiplexed information without the necessity for synchronizing signals between unit stations and therefore no signal is transmitted between the intervals of information input. In addition, the system performs adequately through interference, and in the presence of jamming. Additionally, the equipment can be operated into existing telephone terminal equipments for voice transmission, however, as stated previously, with converters, the system is well adapted also to teletype transmission and reception of facsimile. The system also provides a degree of security against casual eavesdropping when more than one channel is in operation. Determined eavesdropping would require duplication of receiving equipment. Also as pointed out netting between a master and several substations or between several individual stations is possible.

Obviously many modifications and variations of the present invention are possible in the light of the above teachings. It is therefore to be understood that within the scope of the appended claims the invention may be practiced otherwise than as specifically described.

What is claimed is:

1. A quantized nonsynchronous clipped speech multichannel coded communications network comprising a multiplicity of transmitter terminals and receiver terminals; each of said transmitter terminals comprising a multiplicity of audio processing sections, including input means for coupling a composite waveform thereto, pre-emphasis means for generating crossover points corresponding to amplitude excursions in the input composite waveform, clipper means operatively receiving the output of said pre-emphasis means for infinitely clipping the composite waveform thereby removing the amplitude portion and leaving the frequency information, pulse generating means operatively coupled to the output of said clipper means and receiving the output of said clipper means for generating output pulses corresponding to the zero crossover points in the infinitely clipped waveform; a multiplicity of encoding sections corresponding to the audio processing sections, including gate generator means operatively receiving the output of said pulse generating means for generating gate pulses corresponding to said output pulses; a timing unit including, OR circuit means operatively coupled to said gate generating means and receiving pulses therefrom, sampling means for generating pulses corresponding to a desired sampling rate, coincidence means operatively coupled to the output of said sampling means and said OR circuit means for generating an output pulse when pulses from said OR circuit means and said sampling means coincide therein, channel coding means comprising a delay line operatively receiving output pulses from said coincidence means for generating a start stop and channel pulses corresponding to desired channel codes; second coincidence circuit means in said channel unit operatively coupled to said channel coding means and said gate generating means for generating an output pulse when pulses from said gate generating means and said channel coding means coincide therein; and transmitting means operatively coupled to said channel coder means and said second coincident circuit means for receiving start stop pulses from said channel coding means and output pulses from said second coincidence circuit means corresponding to channel codes and propagating pulse trains therefrom; each of said receiver terminals comprising; receiver means for receiving and detecting trains of pulses; channel decoder means for receiving said detected pulse trains, a multiplicity of channel coincidence means operatively coupled to the output of said channel decoder means for generating an output pulse when start stop and channel pulses are coincident therein; audio restorer means corresponding to said channel coincidence means including, flip-flop means operatively receiving output pulses from said channel coincidence means for generating a substantially square waveform in the output thereof, and integrator means receiving the output of said flip-flop and producing a waveform therefrom approximating said original composite waveform.

2. A quantized nonsynchronous clipped speech multichannel coded communications network comprising a multiplicity of communications units; each communications unit comprising a transmitter terminal and receiver terminal; said transmitter terminal comprising audio processing means including means for coupling an input waveform thereto, clipper means operatively receiving said input waveform and infinitely clipping said waveform thereby removing the amplitude portion and leaving the frequency portion, gate generator means operatively receiving the output of said clipper means for producing output pulses therefrom; multiplexing means comprising buffer circuit means operatively receiving the output of said audio processing means, sampling means for producing output pulses corresponding to a desired sampling rate, first coincidence circuit means operatively receiving the output of said sampling means and said buffer circuit means for producing an output pulse when pulses from said sampling means and buffer means are coincident therein, channel coder means operatively receiving the output of said first coincidence circuit means for producing start stop and channel pulses corresponding to address codes contained between said start and stop pulses; second coincidence circuit means operatively receiving the output of said gate generator means and a channel pulse from said channel coder means for producing an output pulse when pulses from said gate generator and said channel coding means are coincident therein, blocking oscillator means operatively receiving the output of said second coincidence circuit means for producing a reset pulse and output pulses wherein said reset pulse is used to turn said gate generator off; and transmitter means operatively receiving said start stop and stop pulses and output pulses from said blocking oscillator means wherein said output pulses from the blocking oscillator means are contained between said start and stop pulses; said receiver terminal comprising receiver means for receiving and detecting propagated trains of pulses; address decoder means receiving said detected pulses; one channel coincidence means corresponding to an appropriate address for said communications unit operatively coupled to the output of said channel decoder means for generating a pulse therefrom when start stop and said address pulse are coincident therein; and audio restorer means corresponding to said address coincidence means for producing a waveform therefrom approximating the original composite waveform.

3. A quantized nonsynchronous clipped speech multichannel coded communications network comprising a multiplicity of communications units; each communications unit comprising a transmitter terminal and receiver terminal; said transmitter terminal comprising at least one audio processing section including means for coupling a composite waveform thereto, clipper means operatively receiving said composite waveform for infinitely clipping a waveform thereby removing the amplitude portion and leaving the frequency portion, pulse generating means operatively receiving said infinitely clipped waveform for generating pulses corresponding to crossover points in said clipped waveform; multiplexing means including, gate generator means operatively receiving output pulses from said pulse generating means for generating gate pulses, OR circuit means operatively receiving gate pulses from said gate generator means for generating output pulses, channel coding means operatively receiving the output of said OR circuit means for generating start stop and channel pulses therefrom wherein said channel pulses are contained between said start and stop pulses; coincidence circuit means operatively receiving output pulses from said gate generator means and said channel coding means for generating output pulses therefrom when gate pulses and channel pulses are coincident therein, blocking oscillator means operatively receiving output pulses from said coincidence circuit means for generating reset pulses and output pulses wherein said reset pulses are coupled to said gate generator means for turning said gate generator off and wherein said output pulses correspond to appropriate channel codes; and transmitter means operatively receiving said start stop and channel pulses corresponding to channel codes therebetween for propagating trains of pulses therefrom; said receiver terminal of said communications unit comprising receiver means for receiving and detecting propagated trains of pulses; channel decoder means receiving said pulses; one channel coincidence circuit means corresponding to a desired channel code operatively coupled to the output of said channel decoder means for generating a pulse therefrom when start stop and an appropriate channel coded pulse are coincident therein; audio restorer means operatively receiving the output of said channel coincidence means for producing a waveform therefrom approximating the original transmitted original composite waveform.

4. A nonsynchronous quantized multi-channel coded clipped speech communications system comprising at least one transmitter terminal and receiver terminal; said transmitter terminal comprising at least one audio processing section; including input means for coupling a composite waveform containing intelligence therein to the transmitter terminal, pre-emphasis means for generating crossover points corresponding to amplitude excursions in said input composite waveform and amplifying said waveform, clipper means receiving the output of said pre-emphasis means for infinitely clipping the amplitude portion of said waveform, pulse generating means operatively coupled to the output of said clipper means for receiving the output of said clipper means and generating output pulses corresponding to zero crossover points in said infinitely clipped waveform; at least one encoding section including, gate generator means operatively receiving said output pulses for generating gate pulses corresponding to said output pulses; a timing unit including, OR circuit means operatively coupled to said gate generating means and receiving pulses therefrom, oscillator means for generating pulses corresponding to a desired frequency, coincidence means operatively coupled to the outputs of said oscillator means and said OR circuit means for generating an output pulse when pulses from said OR circuit means and said oscillator circuit means coincide therein, channel coding means comprising a delay line operatively receiving the output pulses from said coincidence means for generating a start pulse stop pulse and pulses corresponding to desired channel codes; second coincidence circuit means in said channel unit operatively coupled to said channel coding means and said gate generating means for generating an output pulse when pulses from said gate generating means and said channel coding means coincide in said second coincidence circuit means; and transmitting means operatively coupled to said channel coder means and said second coincidence circuit means for receiving start and stop pulses from said channel coding means and output pulses from said second coincidence circuit means and propagating pulse trains therefrom; said receiver assembly comprising receiver means for receiving and detecting trains of pulses; channel decoder means including delay means receiving said pulse trains, at least one channel coincidence means operatively coupled to the output of said delay means for generating an output pulse when start stop and channel pulses are coincident therein; audio restorer means corresponding to said channel coincidence means including, flip-flop means operatively receiving said output pulses from said channel coincidence means for generating a substantially square waveform in the output thereof, and integrator means receiving said waveform and producing a waveform therefrom approximating said original composite waveform.

5. A quantized nonsynchronous channel coded clipped speech communications system comprising at least one transmitter terminal and receiver terminal; said transmitter terminal comprising at least one audio processing section including input means for coupling a composite waveform thereto, clipper means for infinitely clipping the amplitude portion of said input composite waveform, pulse generating means operatively coupled to the output of said clipper means for generating output pulses corresponding to the frequency crossover points of said original composite waveform; multiplexing means comprising at least one encoding section and timing unit; said encoding section including gate generator means for receiving output pulses from said pulse generating means and generating a gating pulse; said timing unit including OR circuit means for receiving gating pulses from said gate generating means, first blocking oscillator means for producing output pulses of a desired frequency, coincidence means receiving output pulses from said OR circuit means and said blocking oscillator means for producing an output pulse therefrom when output pulses from said OR circuit means and said blocking oscillator are coincident therein, channel coding means comprising a delay line operatively receiving said output pulses from said coincidence circuit means for generating start stop and channel pulses corresponding to said encoding sections; second coincidence circuit means operatively receiving gate pulses from said gate generator means and channel pulses from said delay line for producing an output pulse when said output gate pulse and said channel code pulse are coincident therein, second blocking oscillator means operatively receiving the output of said second coincidence circuit means for generating a reset pulse which is operatively coupled to said gate generator means for turning off said gate generator and for producing output pulses; transmitting means including means operatively receiving said start stop pulses from said delay line and said output of said second blocking oscillator, and means for propagating said pulse trains; said receiver assembly comprising receiver means for receiving and detecting said propagated trains of pulses; multichannel decoder means operatively coupled to said receiver means including at least one channel coincident means operatively coupled to the output of said decoder means for generating a pulse when start stop and channel pulses are coincident therein; audio restorer means corresponding to said channel coincidence means including flip-flop means operatively receiving output pulses from said channel coincidence means for generating a substantially square waveform in the output thereof, and integrator means for receiving said waveform from said flip-flop means and producing a waveform therefrom approximating said original composite waveform.

6. A nonsynchronous channel coded quantized communications system comprising at least one transmitter terminal and receiver terminal; said transmitter terminal comprising at least one audio processing section including means for coupling a composite waveform to the input thereof, pulse generating means for generating pulses corresponding to crossover points in said composite waveform; multiplexing means including, gate generator means operatively receiving output pulses from said pulse generating means for generating gate pulses, OR circuit means operatively receiving gate pulses from said gate generator means for generating output pulses, channel coding means operatively receiving the output of said OR circuit means for generating a start pulse stop pulse and channel pulses therefrom, coincidence circuit means operatively receiving output pulses from said gate generator means and said channel coding means for generating output pulses therefrom when gate pulses and channel pulses are coincident therein, blocking oscillator means operatively receiving output pulses from said coincidence circuit means for generating reset pulses and output pulses wherein said reset pulses are coupled to said gate generator means for turning said gate generator off and wherein said output pulses correspond to channel codes; transmitter input means operatively receiving said start stop and channel pulses, and transmitter means operatively coupled to the output of said transmitter input means for propagating said trains of pulses; said receiver assembly comprising receiver means for receiving and detecting propagated trains of pulses; channel decoder means receiving said pulses; at least one channel coincidence means operatively coupled to the output of said channel decoder means for generating a pulse when start stop and channel pulses are coincident therein; audio restorer means corresponding to said channel coincidence means including, flip-flop means operatively receiving said output pulses from said channel coincidence means for generating a substantially square waveform in the output thereof; and integrator means receiving said waveform from said flip-flop means for producing a waveform therefrom approximating the original composite waveform.

7. A quantized nonsynchronous clipped speech multichannel coded communications system comprising at least one transmitter terminal and receiver terminal; said transmitter terminal comprising at least one audio processing section; including input means for coupling an input waveform thereto, clipper means operatively coupled to the input means for infinitely clipping the amplitude portion of said input waveform thereby leaving the frequency portion, pulse generating means operatively coupled to the output of said clipper means for generating output pulses corresponding to zero crossover points in said infinitely clipped waveform; multiplexing means including, gate generator means operatively receiving output pulses from said generating means for generating gate pulses, buffer circuit means operatively receiving the output of said audio processing units, sampling means for sampling the output of said buffer circuit means at a desired frequency, channel coder means operatively receiving the output of said sampling means for generating start stop and channel pulses therefrom wherein said channel pulses lie between said start and stop pulses; coincidence circuit means operatively receiving output pulses from said gate generating means and said channel coder means for producing an output pulse when pulses from said gate generator means and said channel coder means are coincident therein, blocking oscillator means operatively receiving output pulses from said coincidence circuit means for generating a reset pulse and output pulses wherein said reset pulses are used to turn said gate generator off and wherein said output pulses correspond to a channel code; and transmitting means receiving start and stop pulses and output pulses from said blocking oscillator means corresponding to channel codes, pulses wherein said channel coded pulses are contained between said start stop pulses for propagating pulse trains therefrom; said receiver terminal comprising receiver means for receiving and detecting trains of pulses; channel decoder means receiving said trains of pulses; at least one channel coincidence means operatively coupled to the output of said channel decoder means for generating a pulse when start stop and channel pulses are coincident therein and waveform restorer means corresponding to each of said channel coincidence means for producing a waveform therefrom approximating the original composite waveform.

8. A quantized nonsynchronous clipped speech multichannel coded transmitter terminal comprising; at least one audio processing section, including input means for coupling a waveform thereto, pre-emphasis means for generating crossover points corresponding to amplitude excursions in said input waveform and amplifying said waveform, clipper means receiving the output of said pre-emphasis means for infinitely clipping the amplitude portion of said waveform and leaving said frequency portion, pulse generating means operatively coupled to the output of said clipper means for receiving the output of said clipper means and generating output pulses corresponding to zero crossover points in said infinitely clipped waveform; at least one encoding section including, gate generator means operatively receiving said output pulses from said audio processing section for generating gate pulses corresponding to said output pulses; a timing unit including, OR circuit means operatively coupled to said gate generating means and receiving pulses therefrom, sampling means for generating pulses corresponding to a desired sampling frequency, first coincidence means operatively coupled to the output of said sampling means and said OR circuit means for generating an output pulse when pulses from said OR circuit means and said sampling means are coincident therein, channel coding means comprising a delay line operatively receiving output pulses from said first coincidence means for generating a start pulse stop pulse and pulses corresponding to desired channel codes therebetween; second coincidence circuit means in said channel unit operatively coupled to said channel coding means in said gate generating means for generating an output pulse when pulses from said gate generating means and said channel coding means coincide therein; and transmitting means operatively coupled to said channel coder means and said second coincidence circuit means for receiving start and stop pulses from said channel coding means and output pulses from said second coincidence circuit means and propagating pulse trains therefrom wherein said pulses corresponding to said channel codes are contained between said start and stop pulses.

9. A quantized nonsynchronous clipped speech multichannel coded transmitter terminal comprising; at least one audio processing section including, means for coupling a composite waveform to the input thereof, pulse generating means for generating pulses corresponding to crossover points in said input waveform; multiplexing means including, gate generator means operatively receiving output pulses from said pulse generating means for generating gate pulses corresponding to each of said input pulses thereto, OR circuit means operatively receiving gate pulses from said gate generator means for generating output pulses, channel coding means operatively receiving the output of said OR circuit means for generating a start pulse stop pulse and channel pulses contained between said start pulse and stop pulse, coincidence circuit means operatively receiving output pulses from said gate generator means and said channel coding means for generating output pulses therefrom when a gate pulse and a channel pulse are coincident therein, blocking oscillator means operatively receiving output pulses from said coincidence circuit means for generating a reset pulse and an output pulse wherein said reset pulse is coupled to said gate generator means for turning said gate generator off and wherein said output pulses corresponds to a channel code; transmitter input means operatively receiving said start stop and channel pulses, and transmitter means operatively coupled to the output of said transmitter input operatively receiving the output of said transmitter input means for propagating said trains of pulses.

10. A multiplexing system comprising; a multiplicity of information processing sections; each processing section including means for generating output pulses when information is present in the corresponding related information processing section; gate generator means operatively receiving said output pulses for generating gate pulses; buffer circuit means operatively receiving the gate pulses from said gate generator means; sampling means for producing output pulses corresponding to a predetermined sampling rate; first coincidence circuit means receiving output pulses from said buffer circuit means and said sampling means for generating an output pulse therefrom when pulses from said buffer circuit means and said sampling means are coincident therein; channel coding means operatively receiving the output of said first coincidence circuit means for generating start stop and channel pulses so constructed that said channel pulses are contained between said start and stop pulses; second coincidence circuit means operatively coupled to said gate generator means and said channel coder means receiving output pulses from said gate generator means and said channel coder means for generating output pulses therefrom when pulses from said gate generator means and an appropriate channel pulses from said channel coder means are coincident therein; and pulse generating means receiving output pulses from said second coincidence circuit means for generating a first reset pulse which is operatively coupled to said gate generator for turning off said gate generator and substantially simultaneously therewith generating a second pulse.

11. A multiplexing system comprising; a multiplicity of audio processing sections; each of said audio processing sections including means for generating output pulses when intelligence is present in said audio processing section; gate generator means corresponding to each of said audio processing sections for generating gate pulses; OR circuit means operatively receiving the output gate pulses from said gate generating means; sampling means for generating output pulses corresponding to a predetermined sampling rate; first coincidence circuit means receiving pulses from said OR circuit means and said sampling means for generating an output pulse when pulses from said OR circuit means and said sampling means are coincident therein; channel coding means operatively receiving output pulses from said first coincidence circuit means for generating start stop and channel pulses corresponding to the audio processing sections; second coincidence circuit means operatively coupled to said gate generator means and said channel coding means receiving output pulses from said gate generator means and said channel coding means for generating output pulses therefrom when pulses from said gate generator means and channel coder means are coincident therein; and blocking oscillator means receiving output pulses from said second coincidence circuit means for generating a first reset pulse which is operatively coupled to said gate generator for turning off said generator and generating substantially simultaneously therewith a second pulse.

12. A multiplexing system comprising; at least one audio processing section including means for generating output pulses when intelligence is present in an audio processing section; gate generator means corresponding to said audio processing section for generating gate pulses; OR circuit means receiving the output gate pulses from said gate generator means; oscillator means for producing output pulses corresponding to a desired sampling frequency; first coincidence circuit means receiving output pulses from said OR circuit means and said oscillator means for generating an output pulse when pulses from said OR circuit means and said oscillator means are coincident therein; channel coding means comprising delay means for generating start stop and channel pulses corresponding to the audio processing sections; second coincidence circuit means operatively coupled to said gate generator means and said delay line receiving output pulses from said gate generator means and said delay means for generating output pulses therefrom when pulses from said gate generator means and delay line are coincident therein; and blocking oscillator means receiving output pulses from said second coincidence circuit means for generating a first reset pulse which is operatively coupled to said gate generator for turning off said gate generator and a second pulse.

* * * * *